(12) United States Patent
Hannuksela et al.

(10) Patent No.: US 7,711,052 B2
(45) Date of Patent: May 4, 2010

(54) VIDEO CODING

(75) Inventors: Miska Hannuksela, Tampere (FI); Kerem Caglar, Tampere (FI)

(73) Assignee: Nokia Corporation, Espoo (FI)

( * ) Notice: Subject to any disclaimer, the term of this patent is extended or adjusted under 35 U.S.C. 154(b) by 1005 days.

(21) Appl. No.: 09/854,461

(22) Filed: May 15, 2001

(65) Prior Publication Data

US 2001/0040700 A1    Nov. 15, 2001

(30) Foreign Application Priority Data

May 15, 2000    (GB)    ................... 0011606.1

(51) Int. Cl.
*H04N 7/18*    (2006.01)
(52) U.S. Cl. .............. 375/240.27; 375/240.26
(58) Field of Classification Search ................
375/240.01–240.29, 240; *H04N 7/12*
See application file for complete search history.

(56) References Cited

U.S. PATENT DOCUMENTS

| | | | |
|---|---|---|---|
| 4,972,261 A | | 11/1990 | Whalley |
| 5,150,210 A | * | 9/1992 | Hoshi et al. ............. 375/240.14 |
| 5,198,901 A | * | 3/1993 | Lynch .................... 375/240.14 |
| 5,455,629 A | * | 10/1995 | Sun et al. ............... 375/240.24 |
| 5,515,388 A | * | 5/1996 | Yagasaki ................. 375/240.2 |
| 5,706,053 A | | 1/1998 | Urano |
| 5,731,840 A | * | 3/1998 | Kikuchi et al. ......... 375/240.16 |
| 5,926,225 A | * | 7/1999 | Fukuhara et al. ......... 348/416.1 |
| 6,188,728 B1 | * | 2/2001 | Hurst .................... 375/240.16 |
| 6,438,165 B2 | * | 8/2002 | Normile .................... 375/240 |
| 6,683,988 B1 | * | 1/2004 | Fukunaga et al. ...... 375/240.27 |
| 6,700,933 B1 | | 3/2004 | Wu et al. |
| 2002/0009141 A1 | * | 1/2002 | Yamaguchi et al. .... 375/240.12 |

FOREIGN PATENT DOCUMENTS

| | | |
|---|---|---|
| EP | 0637027 A2 | 2/1995 |
| EP | 0702492 A1 | 3/1996 |
| EP | 0711078 | 5/1996 |

OTHER PUBLICATIONS

ITU-Telecommunications Standardization Sector, Ninth Meeting: Red Bank, NJ, Oct. 19-22, 1999 p. 1-2.
ITU-Telecommunications Standardization Sector, Seventh Meeting: Feb. 15-19, 1999, Monterey,CA, USA pp. 1-11.
"Error Concealment in Encoded Video Streams"by Salma, et al pp. 1-32.
"Professor Delp's Recent Publications" Recent Pub. of Edward J. Delp.

(Continued)

*Primary Examiner*—Andy S Rao
(74) *Attorney, Agent, or Firm*—Foley & Lardner LLP

(57) ABSTRACT

A method of encoding a video signal representing a sequence of pictures, the method comprising receiving a current picture for encoding, forming a temporal prediction of the current picture from a default reference picture for the current picture, comparing the default reference picture with at least one further reference picture, calculating a measure of the similarity between the default reference picture and each further reference picture and, if the measure of similarity meets a pre-determined criterion, outputting an indicator identifying the further reference picture.

52 Claims, 7 Drawing Sheets

OTHER PUBLICATIONS

"Picture Layer" 5.1 Recommendation H.263 (Feb. 1998).
"Error Control and Concealment for Video Communication: A Review" pp. 974-997.
ITU-Telecommunications Standardization Sector, Ninth Meeting: Red Bank, New Jersey, Oct. 19-22, 1999 p. 1.
ITU-Telecommunications Standardization Sector, Ninth Meeting: Red Bank, New Jersey, Oct. 19-22, 1999, pp. 1-3.
ITU-Telecommunications Standardization Sector, Ninth Meeting: Red Bank, New Jersey, Oct. 19-22, 1999 p. 1-2.
ITU-Telecommunications Standardization Sector, Ninth Meeting: Red Bank, New Jersey, Oct. 19-22, 1999 pp. 1-2.
ITU-Telecommunications Standardization Sector, Ninth Meeting: Red Bank, New Jersey, Oct. 19-22, 1999.
ITU-Telecommunications Standardization Sector, Nov. 2000, pp. 1-43.
T. Weigand: "Modification of Annex U for Enhanced Error Resilience + Annex U", ITU-Telecommunications Standardization Sector. Q15-J-33, Mar. 13, 2000, XP002183258, Osaka (JP), 17 pages.
Annex L—Supplemental Enhancement Information Specification, ITU-T Recommendation H.263 Series H: Audovisual and Multimedia Systems. Infrastructure of Audiovisual Services—Coding of Moving Video. Video Coding for Low Bit Rate Communication, Feb. 1998, pp. 88-94, XP002183259, pp. 88-94.

* cited by examiner

FIG. 4

| Frame No | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Encoded Frames | I | B | P | B | B | B | P | B | B | P | B | B | P | B | B | P | B | B | P | B | B | I | B |
| SRPN | | | 0 | 0 | 0 | 0 | 0 | 0 | 3 | 3 | 6 | 6 | 6 | 9 | 9 | 9 | 12 | 12 | 12 | 15 | | | 6 |
| TR | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |

FIG. 5

| Frame No | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| Encoded Frames | I | B | P | B | B | B | P | B | B | P | B | B | I | B | B | P | B | B | P | B | B | P | B |
| SRPN | | | | | | | 0 | | | 3 | | | | | | 9 | | | 12 | | | 6 | |
| TR | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |

| PSC | TR | PTYPE | PQUANT | CBM | PSBI | TR_B | DBQUANT | PEI | PSUPP | PEI | GOBs | ESTUF | EOS | PSTUF | ... |

FIG.6

| PSC | TR | PTYPE | PQUANT | CBM | PSBI | TR_B | DBQUANT | SRPN | PEI | ... |

FIG.7

| PSC | TR | PTYPE | PQUANT | CBM | PSBI | TR_B | DBQUANT | SRPN | PEI | PSUPP | PEI | GOBs | ESTUF | EOS | PSTUF |

| FTYPE<br>= SRPN | DSIZE<br>= 1 | PARAMETER DATA<br>= SRPN VALUE |

FIG.8

| PSC | TR | PTYPE | PQUANT | CBM | PSBI | TR_B | DBQUANT | SRPN | PEI | PSUPP | PEI | GOBs | ESTUF | EOS | PSTUF |

| FTYPE<br>= Picture message | CONT | EBIT | MTYPE |

FIG.9

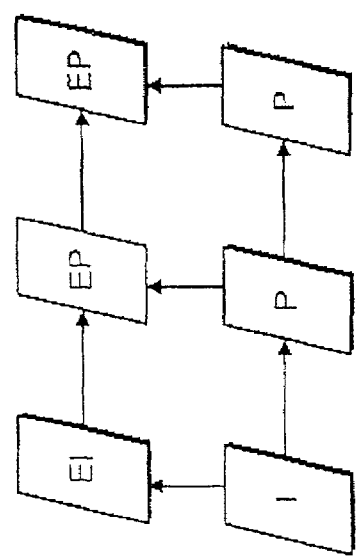
FIG. 10
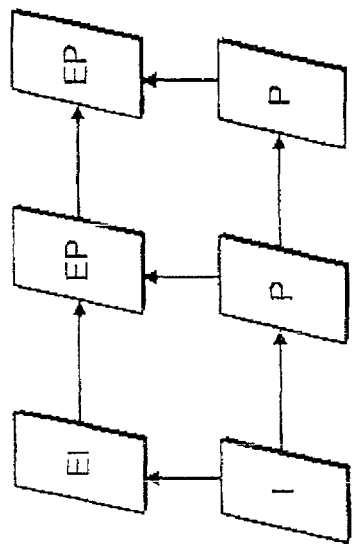
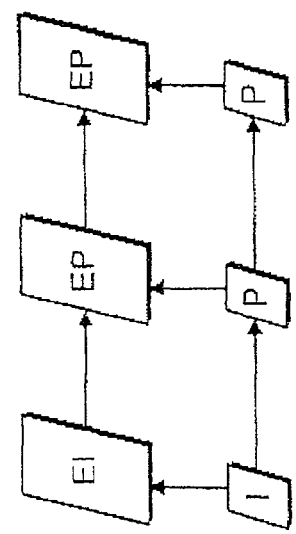
FIG. 11
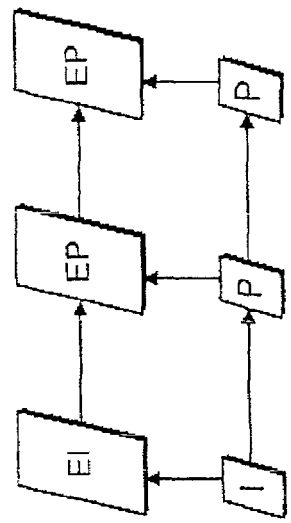

VIDEO CODING

BACKGROUND OF THE INVENTION

Field of the Invention

This invention relates to video coding.

A video sequence consists of a series of still pictures or frames. Video compression methods are based on reducing the redundant and perceptually irrelevant parts of video sequences. The redundancy in video sequences can be categorized into spectral, spatial and temporal redundancy. Spectral redundancy refers to the similarity between the different colour components of the same picture. Spatial redundancy results from the similarity between neighbouring pixels in a picture. Temporal redundancy exists because objects appearing in a previous image are also likely to appear in the current image. Compression can be achieved by taking advantage of this temporal redundancy and predicting the current picture from another picture, termed an anchor or reference picture. Further compression is achieved by generating motion compensation data that describes the motion between the current picture and the previous picture.

However, sufficient compression cannot usually be achieved by only reducing the inherent redundancy of the sequence. Thus, video encoders also try to reduce the quality of those parts of the video sequence which are subjectively less important. In addition, the redundancy of the encoded bit-stream is reduced by means of efficient lossless coding of compression parameters and coefficients. The main technique is to use variable length codes.

Video compression methods typically differentiate between pictures that utilize temporal redundancy reduction and those that do not. Compressed pictures that do not utilize temporal redundancy reduction methods are usually called INTRA or I-frames or I-pictures. Temporally predicted images are usually forwardly predicted from a picture occurring before the current picture and are called INTER or P-frames. In the INTER frame case, the predicted motion-compensated picture is rarely precise enough and therefore a spatially compressed prediction error frame is associated with each INTER frame. INTER pictures may contain INTRA-coded areas.

Many video compression schemes also use temporally bi-directionally predicted frames, which are commonly referred to as B-pictures or B-frames. B-pictures are inserted between anchor picture pairs of I- and/or P-frames and are predicted from either one or both of these anchor pictures. B-pictures normally yield increased compression as compared with forward-predicted pictures. B-pictures are not used as anchor pictures, i.e., other pictures are not predicted from them. Therefore they can be discarded (intentionally or unintentionally) without impacting the picture quality of future pictures. While B-pictures may improve compression performance as compared with P-pictures, their generation requires greater computational complexity and memory usage, and they introduce additional delays. This may not be a problem for non-real time applications such as video streaming but may cause problems in real-time applications such as video-conferencing.

A compressed video clip typically consists of a sequence of pictures, which can be roughly categorized into temporally independent INTRA pictures and temporally differentially coded INTER pictures. Since the compression efficiency in INTRA pictures is normally lower than in INTER pictures, INTRA pictures are used sparingly, especially in low bit-rate applications.

A video sequence may consist of a number of scenes or shots. The picture contents may be remarkably different from one scene to another, and therefore the first picture of a scene is typically INTRA-coded. There are frequent scene changes in television and film material, whereas scene cuts are relatively rare in video conferencing. In addition, INTRA pictures are typically inserted to stop temporal propagation of transmission errors in a reconstructed video signal and to provide random access points to a video bit-stream.

Compressed video is easily corrupted by transmission errors, mainly for two reasons. Firstly, due to utilization of temporal predictive differential coding (INTER frames), an error is propagated both spatially and temporally. In practice this means that, once an error occurs, it is easily visible to the human eye for a relatively long time. Especially susceptible are transmissions at low bit-rates where there are only a few INTRA-coded frames, so temporal error propagation is not stopped for some time. Secondly, the use of variable length codes increases the susceptibility to errors. When a bit error alters the codeword, the decoder will lose codeword synchronization and also decode subsequent error-free codewords (comprising several bits) incorrectly until the next synchronization (or start) code. A synchronization code is a bit pattern which cannot be generated from any legal combination of other codewords and such codes are added to the bit stream at intervals to enable re-synchronization. In addition, errors occur when data is lost during transmission. For example, in video applications using the unreliable UDP transport protocol in IP networks, network elements may discard parts of the encoded video bit-stream.

There are many ways for the receiver to address the corruption introduced in the transmission path. In general, on receipt of a signal, transmission errors are first detected and then corrected or concealed by the receiver. Error correction refers to the process of recovering the erroneous data perfectly as if no errors had been introduced in the first place. Error concealment refers to the process of concealing the effects of transmission errors so that they are hardly visible in the reconstructed video sequence. Typically some amount of redundancy is added by the source or transport coding in order to help error detection, correction and concealment.

There are numerous known concealment algorithms, a review of which is given by Y. Wang and Q.-F. Zhu in "Error Control and Concealment for Video Communication: A Review", Proceedings of the IEEE, Vol. 86, No. 5, May 1998, p p. 974-997 and an article by P. Salama, N. B. Shroff, and E. J. Delp, "Error Concealment in Encoded Video," submitted to IEEE Journal on Selected Areas in Communications.

Current video coding standards define a syntax for a self-sufficient video bit-stream. The most popular standards at the time of writing are ITU-T Recommendation H.263, "Video Coding for Low Bit Rate Communication", February 1998; ISO/IEC 14496-2, "Generic Coding of Audio-Visual Objects. Part 2: Visual", 1999 (known as MPEG-4); and ITU-T Recommendation H.262 (ISO/IEC 13818-2) (known as MPEG-2). These standards define a hierarchy for bit-streams and correspondingly for image sequences and images.

In H.263, the hierarchy has four layers: picture, picture segment, macroblock, and block layer. The picture layer data contain parameters affecting the whole picture area and the decoding of the picture data. Most of this data is arranged in a so-called picture header.

The picture segment layer can either be a group of blocks layer or a slice layer. By default, each picture is divided into groups of blocks. A group of blocks (GOB) typically comprises 16 successive pixel lines. Data for each GOB consists of an optional GOB header followed by data for macroblocks.

If the optional slice structured mode is used, each picture is divided into slices instead of GOBs. A slice contains a number of successive macroblocks in scan-order. Data for each slice consists of a slice header followed by data for the macroblocks.

Each GOB or slice is divided into macroblocks. A macroblock relates to 16×16 pixels (or 2×2 blocks) of luminance and the spatially corresponding 8×8 pixels (or block) of chrominance components. A block relates to 8×8 pixels of luminance or chrominance.

Block layer data consist of uniformly quantized discrete cosine transform coefficients, which are scanned in zigzag order, processed with a run-length encoder and coded with variable length codes. MPEG-2 and MPEG-4 layer hierarchies resemble the one in H.263.

By default, these standards use the temporally previous anchor (I, EI, P, or EP) picture as a reference for temporal prediction. This piece of information is not transmitted, i.e. the bit-stream does not contain information relating to the identity of the reference picture. Consequently, decoders have no means to detect if a reference picture is lost. Many transport coders packetize video data in such a way that they associate a sequence number with the packets. However, these kinds of sequence numbers are not related to the video bit-stream. For example, a section of a video bit-stream may contain the data for P-picture P1, B-picture B2, P-picture P3, and P-picture P4 captured (and to be displayed) in this order. However, this section of the video bitstream would be compressed, transmitted, and decoded in the following order: P1, P3, B2, P4 since B2 requires both P1 and P3 before it can be encoded or decoded. Let us assume that there is one packet per one picture and each packet contains a sequence number. Let us further assume that the packet carrying B2 is lost. The receiver can detect this loss from the packet sequence numbers. However, the receiver has no means to detect if it has lost a motion compensation reference picture for P4 or if it has lost a B-picture, in which case it could continue decoding normally.

The decoder therefore usually sends an INTRA request to the transmitter and freezes the picture on the display. However the transmitter may not be able to respond to this request. For instance in a non-real-time video streaming application, the transmitter cannot respond to an INTRA request from a decoder. Therefore the decoder freezes the picture until the next INTRA frame is received. In a real-time application such as video-conferencing, the transmitter may not be able to respond. For instance, in a multi-party conference, the encoder may not be able to respond to individual requests. Again the decoder freezes the picture until an INTRA frame is output by the transmitter.

SUMMARY OF THE INVENTION

According to a first aspect of the invention there is provided a method of encoding a video signal representing a sequence of pictures, the method comprising receiving a current picture for encoding, forming a temporal prediction of the current picture from a default reference picture for the current picture, comparing the default reference picture with at least one further reference picture, calculating a measure of the similarity between the default reference picture and each further reference picture and, if the measure of similarity meets a pre-determined criterion, outputting an indicator identifying the further reference picture and associating the indicator with the temporal prediction of the current frame.

Encoders can use this indicator to instruct decoders which pictures resemble the current motion compensation reference picture so well that one of them can be used as a spare reference picture if the actual reference picture is lost during transmission. If a decoder lacks an actual reference picture but can access a spare reference picture, preferably the decoder should not send a request for an INTRA picture update. The indicator may be termed a spare reference picture number since the indicator indicates to a decoder which reference picture(s) resemble the default reference picture. This "spare" reference picture may be used by a decoder to decode the current frame if the default reference picture is lost for some reason.

The spare reference picture number may be in respect of the whole picture or part of a picture. In the former case, typically the spare reference picture number is included in a picture header. In the latter case the spare reference picture number is included in the picture segment headers or macroblock headers of the picture. In a preferred implementation of the invention, the video signal is encoded according to the H.263 standard and the indicator is included in the Supplemental Enhancement Information.

Preferably the method also comprises forming a temporal prediction of the current picture from a first default reference picture and a second default reference picture for the current picture, said first default reference picture occurring temporally before the current picture and said second default reference picture occurring temporally after the current picture, comparing the first default reference picture with at least one further reference picture occurring temporally before the current picture, calculating a measure of the similarity between the first default reference picture and each further reference picture and, if the measure of similarity meets a pre-determined criterion, outputting an indicator identifying the further reference picture.

Thus an indicator is provided for forwardly predicted frames but not for backwardly predicted frames.

Preferably the default reference picture is compared with a plurality of further reference pictures and an indicator is output for each further reference picture that meets the pre-determined criterion. Advantageously the further reference pictures that meet the predetermined criterion are ranked in order of similarity and the indicator is associated with the temporal prediction of the current frame in order of rank, the further reference picture having the closest similarity to the default reference picture being placed first. The comparison may be carried out for portions of a picture at a time e.g. blocks or other non-rectangular areas of the pictures.

According to a second aspect of the invention there is provided a method of encoding a video signal representing a sequence of pictures, the method comprising receiving a current picture for encoding, forming a prediction of at least part of the current picture from a default reference picture for the current picture, comparing the part of the default reference picture or the current picture with a corresponding part of at least one further picture of the sequence to form a measure of similarity and, if the measure of similarity meets a pre-determined criterion, outputting an indicator in respect of the part of the current frame identifying the further picture of the sequence.

According to a third aspect of the invention there is provided a method of decoding an encoded video signal representing a sequence of pictures, the encoded signal including pictures that have been encoded by forming a temporal prediction of a current picture from a default reference picture for the current picture, the method comprising receiving an encoded video signal representing a current picture and decoding at least the picture header of the current picture wherein, when the decoder is unable to decode the default reference picture of the current picture, examining an indicator identifying a further reference picture and decoding the current picture with reference to said further reference picture if such an indicator is associated with the current picture.

According to a fourth aspect of the invention there is provided a video encoder comprising an input for receiving a video signal representing a sequence of pictures, an input for receiving a current picture for encoding, a predictive coder for forming a temporal prediction of the current picture from a default reference picture for the current picture, a comparator for comparing the default reference picture or the current picture with at least one further reference picture and calculating a measure of the similarity and, when the measure of similarity meets a pre-determined criterion, outputting an indicator identifying the further reference picture.

According to a fifth aspect of the invention there is provided a video decoder comprising an input for receiving an encoded video signal representing a sequence of pictures, the encoded signal including pictures that have been encoded by forming a temporal prediction of a current picture from a default reference picture for the current picture, the decoder comprising an input for receiving an encoded video signal representing a current picture and a processor for decoding at least the picture header of the current picture wherein, when the decoder is unable to decode the default reference picture of the current picture, the decoder is arranged to examine an indicator identifying a further reference picture and to decode the current picture with reference to said further reference picture if such an indicator is associated with the current picture.

The invention also relates to a radio telecommunications device including an encoder and/or a decoder as described.

BRIEF DESCRIPTION OF THE DRAWINGS

The invention will now be described, by way of example only, with reference to the accompanying drawings, in which:

FIG. 4 illustrates the operation of a first embodiment of a video encoder according to the invention;

FIG. 5 illustrates the operation of a second implementation of a video encoder according to the invention;

FIG. 6 shows the syntax of a bit stream as known according to H.263;

FIG. 7 shows a first example of a bit stream output by an encoder according to the invention;

FIG. 8 shows a second example of a bit stream output by an encoder according to the invention;

FIG. 9 shows a third example of a bit stream output by an encoder according to the invention;

FIG. 10 illustrates enhancement layers used in video coding for SNR scalability; and FIG. 11 illustrates enhancement layers used in video coding for spatial scalability.

DETAILED DESCRIPTION OF THE INVENTION

Figure 1:
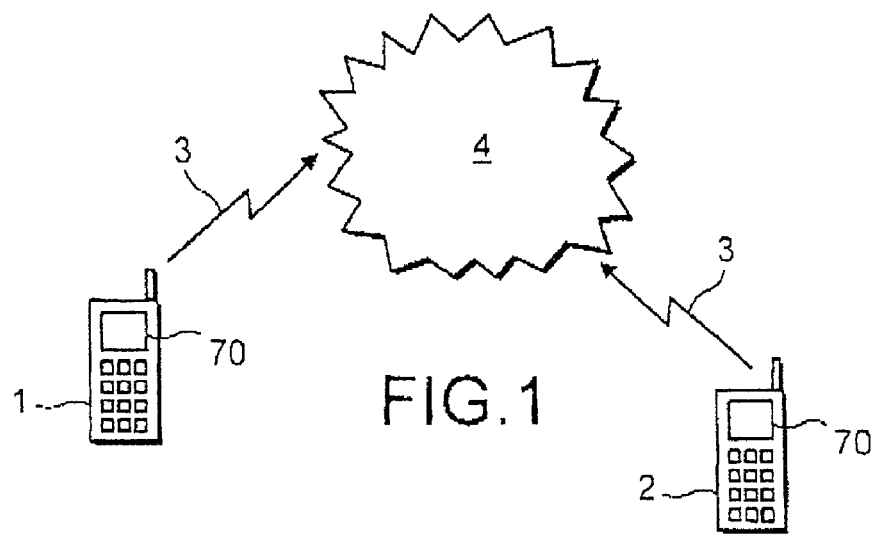
FIG. 1 shows a multimedia mobile communications system.

FIG. 1 shows a typical multimedia mobile communications system. A first multimedia mobile terminal 1 communicates with a second multimedia mobile terminal 2 via a radio link 3 to a mobile communications network 4. Control data is sent between the two terminals 1,2 as well as the multimedia data.

Figure 2:
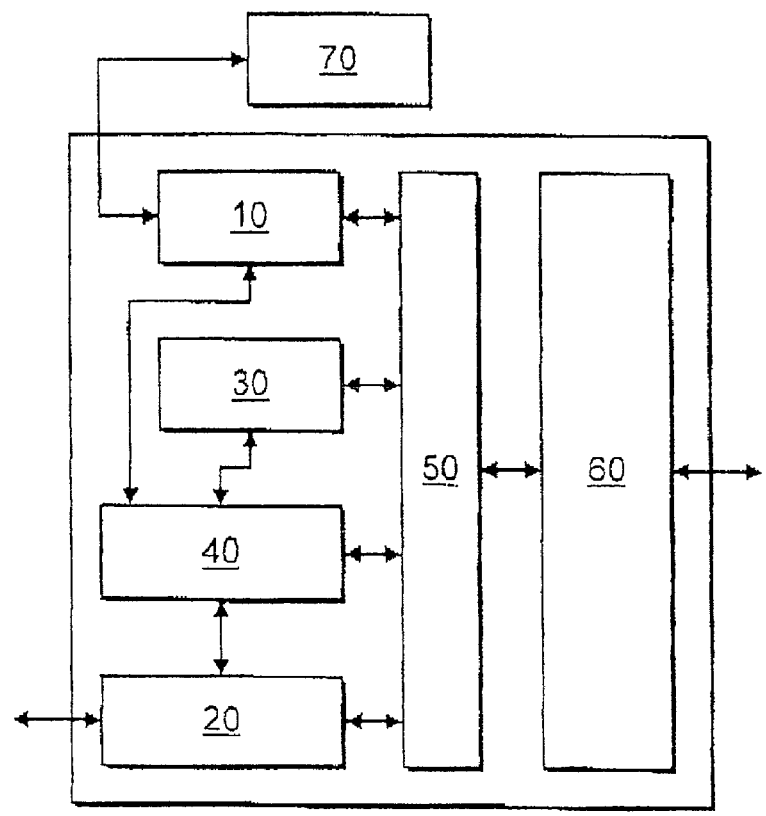
FIG. 2 shows an example of the multimedia components of a multimedia terminal.

FIG. 2 shows the typical multimedia components of a terminal 1. The terminal comprises a video codec 10, an audio codec 20, a data protocol manager 30, a control manager 40, a multiplexer/demultiplexer 50 and a modem 60 (if the required). The video codec 10 receives signals for coding from a video capture device of the terminal (not shown) (e.g. a camera) and receives signals for decoding from a remote terminal 2 for display by the terminal 1 on a display 70. The audio codec 20 receives signals for coding from the microphone (not shown) of the terminal 1 and receives signals for decoding from a remote terminal 2 for reproduction by a loudspeaker (not shown) of the terminal 1. The terminal may be a portable radio communications device, such as a radio telephone.

The control manager 40 controls the operation of the video codec 10, the audio codec 20 and the data protocols manager 30. However, since the invention is concerned with the operation of the video codec 10, no further discussion of the audio codec 20 and data protocols manager 30 will be provided.

Figure 3:
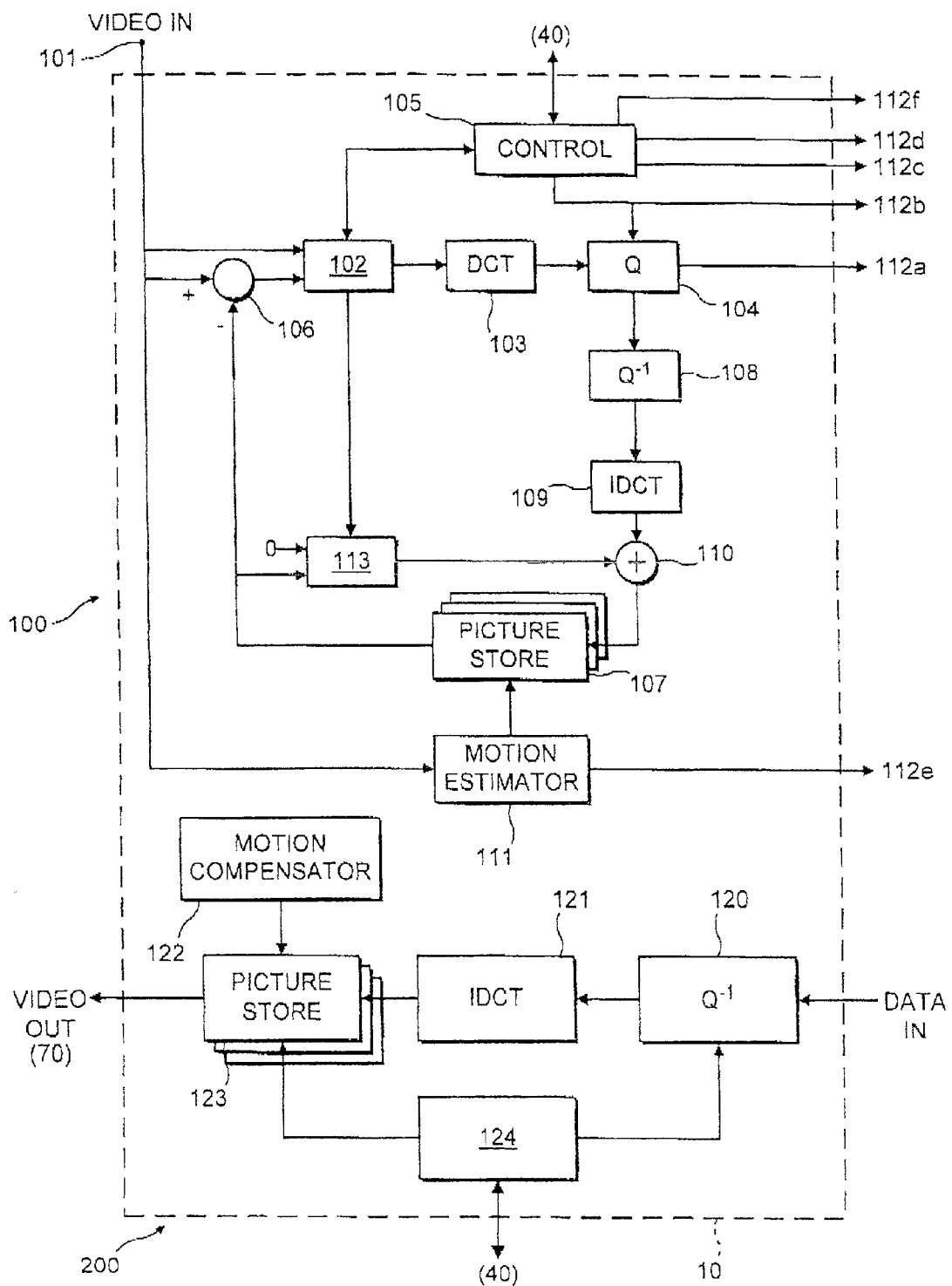
FIG. 3 shows an example of a video codec.

FIG. 3 shows an example of a video codec 10 according to the invention.

The video codec comprises an encoder part 100 and a decoder part 200. The encoder part 100 comprises an input 101 for receiving a video signal from a camera or video source (not shown) of the terminal 1. A switch 102 switches the encoder between an INTRA-mode of coding and an INTER-mode. The encoder part 100 of the video codec 10 comprises a DCT transformer 103, a quantizer 104, an inverse quantizer 108, an inverse DCT transformer 109, an adder 110, a plurality of picture stores 107 (see FIG. 3a for more detail), a subtractor 106 for forming a prediction error, a switch 113 and an encoding control manager 105.

The decoder part 200 of the video codec 10 comprises an inverse quantizer 120, an inverse DCT transformer 121, a motion compensator 122, a plurality of picture stores 123 and a controller 124. The controller 124 receives video codec control signals demultiplexed from the encoded multimedia stream by the demultiplexer 50. In practice the controller 105 of the encoder and the controller 124 of the decoder may be the same processor.

The operation of an encoder according to the invention will now be described. The video codec 10 receives a video signal to be encoded. The encoder 100 of the video codec encodes the video signal by performing DCT transformation, quantization and motion compensation. The encoded video data is then output to the multiplexer 50. The multiplexer 50 multiplexes the video data from the video codec 10 and control data from the control 40 (as well as other signals as appropriate) into a multimedia signal. The terminal 1 outputs this multimedia signal to the receiving terminal 2 via the modem 60 (if required).

In INTRA-mode, the video signal from the input 101 is transformed to DCT co-efficients by a DCT transformer 103. The DCT coefficients are then passed to the quantizer 104 that quantizes the coefficients. Both the switch 102 and the quantizer 104 are controlled by the encoding control manager 105 of the video codec, which may also receive feedback control from the receiving terminal 2 by means of the control manager 40. A decoded picture is then formed by passing the data output by the quantizer through the inverse quantizer 108 and applying an inverse DCT transform 109 to the inverse-quantized data. The resulting data is then input to the adder 110. In INTRA mode, the switch 113 is set so that the input to the adder 110 from the switch 113 is set to zero. The two inputs to the adder 110 are added together and the resulting data input to the picture store 107.

In INTER mode, the switch 102 is operated to accept from the subtractor 106 the difference between the signal from the input 101 and a reference picture which is stored in a picture store 107. The difference data output from the subtractor 106 represents the prediction error between the current picture and the reference picture stored in the picture store 107. A motion estimator 111 may generate motion compensation data with reference to the data in the picture store 107 in a conventional manner.

The encoding control manager 105 decides whether to apply INTRA or INTER coding or whether to code the frame at all on the basis of either the output of the subtractor 106 or in response to feedback control data from a receiving decoder. The encoding control manager may decide not to code a received frame at all when the similarity between the current frame and the reference frame is so high or there is not time to code the frame. The encoding control manager operates the switch 102 accordingly.

When not responding to feedback control data, the encoder typically encodes a frame as an INTRA-frame either only at the start of coding (all other frames being P-frames), or at regular periods e.g. every 5 s, or when the output of the subtractor exceeds a threshold i.e. when the current picture and that stored in the picture store 107 are judged to be too dissimilar. The encoder may also be programmed to encode frames in a particular regular sequence e.g. I B B P B B P BBPBBPBBIBBPetc.

The video codec outputs the quantized DCT coefficients 112a, the quantizing index 112b (i.e. the details of the quantizing used), an INTRA/INTER flag 112c to indicate the mode of coding performed (I or P/B), a transmit flag 112d to indicate the number of the frame being coded and (in INTER mode) the motion vectors 112e for the picture being coded. These are multiplexed together with other multimedia signals by the multiplexer 50.

Figure 3A:
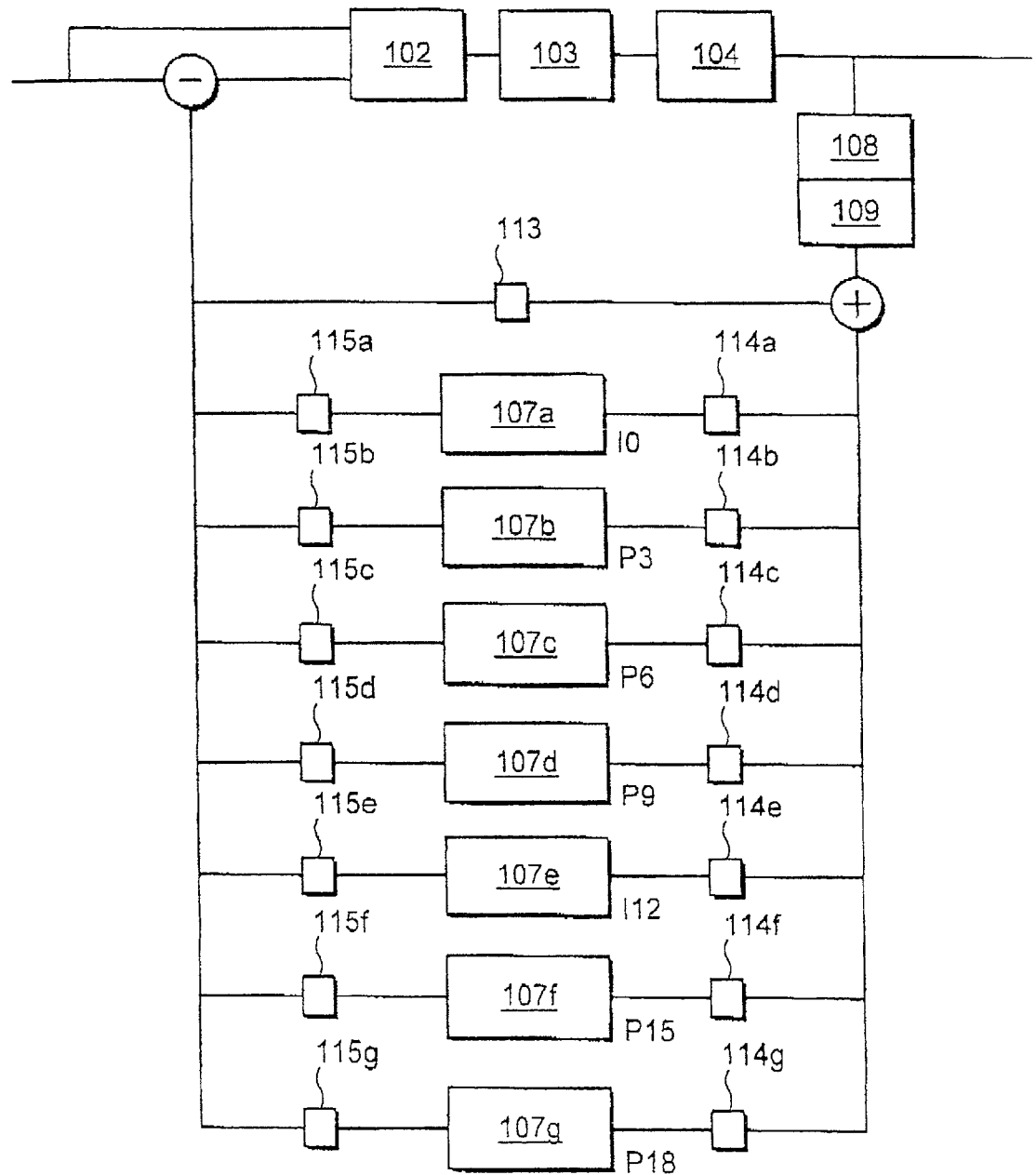
FIG. 3a shows a more detailed view of a video encoder according to the invention.

The encoder 100 will be described further with reference to FIG. 3a, which shows a simplified view of the encoder 100 of the video codec. The encoder 100 comprises a plurality of picture stores 107a-107g. Although in this example seven picture stores are shown, the number of picture stores may be two or more.

Consider an encoder that is arranged to encode an input signal with the format I B B P B B P B B P B B P B B P B B P B B I etc. For simplicity we will assume that the encoder will encode every frame of the input signal i.e. no frames will be skipped. This is illustrated in FIG. 4.

As mentioned earlier, the frames are received from a video capture device in the order 0, 1, 2, 3,4,5,6 etc. and are displayed in this order i.e. the decoded frames are displayed in the order I0,B1,B2,P3,B4,B5,P6 etc. However the video bit stream is compressed, transmitted and decoded in the following order I0, P3, B1, B2, P6, B4, B5 etc. This is because each B-frame requires preceding and succeeding reference frames before it can be encoded/decoded i.e. frame B1 requires frame I0 and P3 to be encoded/decoded before it can be encoded/decoded.

When the first frame is received, all of the picture stores 107 are empty and the switch 102 is placed into the INTRA mode under control of the encoding controller 105 so that the input signal is encoded in INTRA format. The input signal is DCT transformed and quantized. This is done on a macroblock by macroblock basis. The resulting signal is then decoded by inverse quantizer 108 and inverse DCT 109. Since the frame is INTRA coded, switch 113 is open. The output of adder 110 is input to the first picture store 107a. For this purpose switch 114a is closed whereas switches 114b-g are open. Thus frame store 107a holds a decoded version of reference picture 10.

The next picture to be coded is frame 3, which is to be forwardly predicted from I0. Therefore when frame 3 is input at 101, switch 102 is changed to the INTER mode, the output switch 115 of the most recent reference picture store (i.e. switch 115a) is closed and the motion compensated contents of picture store 107a are subtracted from the input signal, motion compensation data having been calculated in the conventional manner. This prediction error is then encoded by DCT 103 and quantizer 104 and decoded by inverse quantizer 108 and IDCT 109. The switch 113 is then closed, switch 115a closed and switch 114b closed (the other switches 114 and 115 being open). Thus adder 110 adds the decoded picture to the picture as stored in picture store 107a and stores the result in picture store 107b.

The next frame to be coded is frame 2, which is to be coded as a B-frame. Thus the contents of both of the frame stores 107a and 107b are made available to the subtractor 106 in a conventional manner. Since B-frames do not form a reference picture for any other frame, the encoded B-frame is not decoded and stored in a reference picture store.

Thus in the case described above, after 19 frames, the frame stores 107a to 107g contain decoded versions of frames I0, P3, P6, P9, P12, P15 and P18 respectively.

In the invention, when the encoder encodes a frame in a predictive manner, the encoding control manager 105 may associate with the frame a Spare Reference Picture Number (SRPN). For example, a SRPN may be associated with the P and B frames of a video signal but not with the I-frames.

Encoders can use this message to instruct decoders which reference picture or pictures resemble the current reference picture, so that one of them can be used as a spare reference picture if the actual reference picture is lost during transmission.

When frame 3 is encoded with reference to frame 0, no other reference frames are stored in the reference picture stores 107a-g. Therefore no SRPN is associated with frame 3. Similarly when frames 1 and 2 are bi-directionally encoded with reference to frames 0 and 3, there are no other frames held in the reference picture stores 107a-g. Therefore no SRPN is associated with either of these frames.

However when frame 6 is forwardly predicted from frame 3 (the decoded version of which is stored in picture store 107b) there is also a decoded copy of frame I0 in picture store 107a. The encoder calculates the similarity between the default reference picture of the current frame (i.e. frame 3 for frame 6) and the contents of the other populated picture stores i.e. picture store 107a. If two reference pictures are sufficiently similar (e.g. the correlation between the contents of frame store 107a and 107b is above a threshold), the encoder associates a SRPN with the data for frame 6. The SRPN identifies frame 0 as a spare reference picture. However, if the similarity is not sufficient, no SRPN is associated with frame 6.

The way in which the measure of similarity is generated is not material to the invention and any suitable measure of similarity may be used. For instance, a Sum of Absolute Differences (SAD) may be used as a measure of similarity. Preferably, an SAD value is calculated by taking the difference in value between spatially corresponding pixels in the default reference picture for the current frame and another "potential" reference frame i.e. a frame stored in one of the picture stores 107. The absolute value of each difference is obtained and the absolute difference values are accumulated to form the SAD. In this way, the SAD is representative of the similarity between the default reference frame and the other potential reference frame. Clearly two pictures can be deemed sufficiently similar when the SAD between them is below a threshold. Alternatively, the similarity of the default reference frame and another potential reference frame for the current picture can be assessed using picture histograms. A picture histogram is a measure of the number of occurrences of pixel values within a given image and two pictures can be deemed similar if their histograms correspond to a significant degree.

In an alternative embodiment of the invention, instead of determining the similarity between the default reference frame for the current frame and another potential reference frame, the encoder examines the similarity between another potential reference frame available in one of the picture stores 107 and the current frame itself. In this alternative embodiment of the invention a threshold is set defining the maximum difference allowable between the current frame and the potential reference frame. Thus any stored frame which exhibits a sufficiently high similarity (small difference) with the current frame can be used as a spare reference picture for the current picture. Again a Sum of Absolute Differences (SAD), image histogram, or any other appropriate method can be used to assess the degree of similarity/difference between the current frame and the other potential reference frame(s).

As will be appreciated, when frame 15 is to be encoded (as a P-frame), decoded versions of frames 0, 3, 6, 9 and 12 are held in picture stores 114a-e respectively. By default, frame 15 is encoded with reference to frame 12 as stored in picture store 107e. The encoder also carries out a calculation of the correlation between the data in the picture store 107e and the data stored in the other populated picture stores 107a-d. The encoder identifies the picture store (and hence the reference picture) that has the closest correlation with the contents of picture store 107e i.e. with the default reference picture for the current frame being coded. The encoder then adds a SRPN to the encoded data that indicates the identified reference picture. This SRPN can be equal to the Temporal Reference of the reference picture as will be described below.

More than one SRPN may be associated with a frame. In this case, the SRPN are ordered within the picture header in the order of similarity, the most similar reference picture (other than the default) being mentioned first.

The encoding control manager 105 outputs this SRPN codeword on output 112f which indicates the Spare Reference Picture Number associated with the encoded frame. This is multiplexed into the video bitstream by a multiplexer.

FIG. 4 illustrates the operation of a first embodiment of the encoder. The first line of FIG. 4 represents the frames of data received from a capture input device and input to the video coder on input 101. The second line of FIG. 4 represents those frames of the input signal that the encoder decides to encode and the coding mode used to encode each frame. As mentioned above, in this example the encoder is arranged to encode every frame and to use the IBBP coding format.

Frame 0 is coded in INTRA-mode; frame 1 is encoded as a B-frame with reference to frame 0 and/or 3; frame 2 is encoded as a B-frame with reference to frame 0 and/or 3; frame 3 is encoded as a P-frame with reference to frame 0; frame 4 is encoded as a B-frame with reference to frame 3 and/or 6; frame 5 is encoded as a B-frame with reference to frame 3 and/or 6; frame 6 is encoded as a P-frame with reference to frame 3; etc.

The third line of FIG. 4 shows a SRPN field associated with frames of the encoded signal. In this embodiment a SRPN is associated with the P-frames and B-frames, as shown in the third line of FIG. 4. The P-frames and B-frames of the encoded frames are temporally predictively encoded and the I-frames are not.

The fourth line of FIG. 4 shows the Temporal Reference (TR) of the encoded frame. This is a field included in H.263 and the value of TR is formed by incrementing its value in the temporally previous reference picture header by one plus the number of skipped or non-reference pictures since the previously transmitted reference picture. Thus in the example shown in FIG. 4 the TR shown for each frame is the same as the original temporal order of the frames in the original signal input to 101.

Examples of possible values of SRPN are shown. These values indicate the TR of the spare reference frame as identified by the encoder as described above. Although this example shows only one SRPN for each predictively encoded picture, more than one may be associated with each predictively encoded picture, as described earlier.

FIG. 5 illustrates the operation of a second embodiment of an encoder according to the invention. In this embodiment, the encoder is arranged to code the frames according to the regular sequence I B B P B B P B B P B B I B B P B B P. However, in the embodiment, a SRPN is associated with forwardly predicted frames (i.e. P-frames) only.

The first line of FIG. 5 shows the input frames and the second line shows the coded frames and their coding mode, I, P or B.

The third line of FIG. 5 shows the SRPN associated with P-frames. These may be generated as discussed above with reference to FIG. 3a.

The fourth line of FIG. 5 shows the Temporal Reference (TR) of the encoded frame. As in the example shown in FIG. 4, the TR shown for each frame is the same as the original temporal order of the frames in the original signal input to 101.

Considering the terminal 1 as receiving coded video data from terminal 2, the operation of the video codec 10 will now be described with reference to its decoding role. The terminal 1 receives a multimedia signal from the transmitting terminal 2. The demultiplexer 50 demultiplexes the multimedia signal and passes the video data to the video codec 10 and the control data to the control manager 40. The decoder 200 of the video codec decodes the encoded video data by inverse quantizing, inverse DCT transforming and motion compensating the data. The controller 124 of the decoder checks the integrity of the received data and, if an error is detected, attempts to conceal the error in a manner to be described below. The decoded, corrected and concealed video data is then stored in one of the picture stores 123 and output for reproduction on a display 70 of the receiving terminal 1.

Errors in video data may occur at the picture level, the GOB level or the macroblock level. Error checking may be carried out at any or each of these levels.

Considering first the signal as shown in FIG. 4, when a decoder according to the invention receives this signal each frame of the signal is decoded in a conventional manner and then displayed on a display means. The decoded frame may be error corrected and error coded in a conventional manner. Each time a frame is decoded, the decoder examines the TR field to determine when the frame is to be displayed.

In the case shown in FIG. 4 the decoder receives frame 0 and determines from its picture header that the frame is INTRA-coded. The decoder decodes frame 0 without reference to any other picture and stores it in picture store 123a. The decoder then receives frame 3 and determines from its picture header that the frame is INTER-coded as a P-frame.

The decoder therefore decodes frame 3 with reference to the preceding reference frame 0 and stores it in the next picture store 123b. The decoder then decodes frames 1 and 2 with reference to frames 0 and 3 and so on. These frames are not stored in the picture stores 123 since, as B-pictures, they are not used as a reference frame for any other frame.

Let us now assume that the decoder is unable to decode (and thus reconstruct) frame 9 (this could be due to the data for frame 9 being greatly corrupted or being lost altogether). The next frame received by the decoder is frame 7, with TR=7, and SRPN=0. As frame 9 (one of the default reference pictures for frame 7) was not decoded by the decoder, the decoder looks for a SRPN in the header of the received frame for the backward prediction. However, frame 7 does not include a SRPN in the backward direction. Therefore the decoder is unable to decode frame 7. This is also the case for frame 8.

The next frame to be received is frame 12, which was encoded with reference to picture 9 and has SRPN=6. Since frame 9 was not decoded, the decoder uses the reference picture indicated by SRPN (i.e. frame 6 stored in picture store 123c) to decode frame 12. The decoder then receives frame 10, which was encoded with reference to frames 9 and 12. Frame 9 was not decoded by the decoder. However frame 10 has SRPN=6. Therefore the decoder uses the decoded reference frame 6, stored in picture store 123c, to decode frame 10 in the forward direction, rather than frame 7. This is also true for frame 11.

The decoder may detect the omission of a reference frame in a number of ways, for instance information relating to the temporal order of each encoded frame may be examined. Alternatively, the reference frames of an encoded signal may be allocated a number in a sequential order as described in a British patent application filed by the Applicant on even date.

If the decoder has the facility to send control feedback data to the transmitting video encoder, the decoder can send a request to the transmitting video encoder to encode a frame as an INTRA-frame and so stop the temporal error propagation that would result from frames 10 and 11 being decoded with reference to frame 6. The decoder continues to decode the signal in a conventional manner.

When the decoder receives frame 21, which is an INTRA frame, the decoder decodes frame 21 without reference to any other frame and stores the decoded frame in picture store 123. The decoder then decodes frames 19 and 20 with reference to frames 18 and 21. Even though some error may have been introduced to frame 18 by decoding frame 12 with reference to frame 6 rather than frame 9, the resulting image should be acceptable and the displayed picture is not held frozen until an INTRA picture is received. This may be more acceptable to a viewer.

Considering now the signal as shown in FIG. 5, when a decoder according to the invention receives this signal each frame of the signal is decoded in a conventional manner and then displayed on a display means. The decoded frame may be error corrected and error concealed in a conventional manner. Each time a frame is decoded, the decoder examines the TR field to determine when the frame is to be displayed.

The decoder receives frame 0, which is an INTRA frame and decodes it accordingly and stores it in picture store 123a. Let us now assume that the decoder is unable to reconstruct frame 3 (this could be due to the data being greatly corrupted or being lost altogether) and the next frame received and decoded by the decoder is frame 1. Frame 1 is a bi-directional frame encoded with reference to frame 0 and 3. Since frame 3 is lost, the decoder is unable to reconstruct frame 1 and similarly frame 2. The fact that B-frames 1 and 2 have been lost is of no consequence to the decoder as the B-frame does not form a reference picture for any other frame and thus its loss will not introduce any temporal error propagation. The decoder continues to decode the signal in a conventional manner.

The next frame received and decoded by the decoder is frame 6. The decoder knows that the preceding reference picture P3 has been lost (because it could not decode frame 1 or 2). The decoder therefore examines the header of the received frame for an SRPN. The decoder determines that frame 6 has a SRPN=0 and so uses frame 0 in the picture store 123a to decode frame 6.

If the decoder has the facility to send control feedback data to the transmitting video encoder the decoder can send a request to the transmitting video encoder to encode a frame as an INTRA-frame and so stop the temporal error propagation that would result from subsequent frames being decoded with reference to frame 6 which was decoded with reference to frame 0 rather than the default frame 3. However the decoder can continue decoding and does not freeze the picture on the display whilst it waits for an INTRA-coded frame.

How the spare reference picture number may be included in the encoded signal will now be addressed with reference to the H.263 video coding standard.

FIG. 6 shows the syntax of a bit stream as known according to H.263. The following implementations describe the GOB format but it will be clear to a skilled person that the invention may also be implemented in the slice format.

As mentioned already, the bit stream has four layers: the picture layer, picture segment layer, macroblock layer and block layer. The picture layer comprises a picture header followed by data for the Group of Blocks, eventually followed by any optional end-of-sequence code and stuffing bits.

The prior art H.263 bit stream is formatted as shown in FIG. 6. A descriptor for each part is given below:

PSC The picture start code (PSC) indicates the start of the picture

TR The Temporal Reference (TR) is formed by incrementing its value in the temporally previous reference picture header by one plus the number of skipped or non-referenced pictures since the previously transmitted one PTYPE Amongst other things, PTYPE includes details of the picture coding type i.e. INTRA or INTER PQUANT A codeword that indicates the quantizer to be used for the picture until updated by any subsequent quantizer information CPM A codeword that signals the use of optional continuous presence multipoint and video multiplex (CPM) mode PSBI Picture Sub-Bit stream Indicator only present if CPM is set $TR_B$ Present if the frame is a bi-directionally predicted frame (known as a PB-frame)

DBQUANT Present if a bi-directional frame

PEI This relates to extra insertion information and is set to "1" to indicate the presence of the following optional data fields PSUPP and PEI. PSUPP and PEI are together known as Supplemental Enhancement Information, which is further defined in Annex L of H263.

GOBS Is the data for the group of blocks for the current picture

ESTF A stuffing codeword provided to attain byte alignment before EOS

EOS A codeword indicating the end of the data sequence for the picture

PSTUF A stuffing codeword to allow for byte alignment of the next picture start code PSC The structure as shown in FIG. 6 does not include the optional PLUSTYPE data field. PSBI is only present if indicated by CPM. TR$_B$ and DBQUANT are only present if PTYPE indicates use of a so-called PB frame mode (unless the PLUSTYPE filed is present and the used of DBQUANT is indicated therein). These issues are addressed in more detail in the H.263 specification.

The following paragraphs outline possible implementations of the bit-stream output by an encoder according to the first aspect of the invention.

The spare reference picture number may be incorporated into a H.263 bit stream as follows. FIG. 7 shows an example of a bit stream output by an encoder according to the first implementation of the invention. As shown in FIG. 7, the bit stream includes a further codeword SRPN which is a codeword indicating the Spare Reference Picture Number. This is inserted by an encoder according to the invention, as described above.

Alternatively, the SRPN may be included in the Supplemental Enhancement Information PSUPP (see Annex L of H.263 and FIG. 4). The supplemental information may be present in the bit stream even though the decoder may not be capable of providing the enhanced capability to use it, or even to properly interpret it. Simply discarding the supplemental information is allowable by decoders unless a requirement to provide the requested capability has been negotiated by external means.

If PEI is set to "1", then 9 bits follow consisting of 8 bits of data (PSUPP) and then another PEI bit to indicate if a further 9 bits follow and so on.

The PSUPP data consists of a 4-bit function type indication FTYPE, followed by a 4-bit parameter data size specification DSIZE followed by DSIZE octets of function parameter data, optionally followed by another FTYPE and so on. It is known to use this PSUPP codeword to signal various situations such as: to indicate a full-picture or partial-picture freeze or freeze-release request with or without resizing; to tag particular pictures or sequences of pictures within the video stream for external use; or to convey chroma key information for video compositing.

To implement the invention using the Supplemental Enhancement Information, a further FTYPE is defined as Spare Reference Picture Number.

FIG. 8 illustrates the example where a parameter SRPN is included in the SEI of the picture header. The FTYPE is defined as SRPN. The DSIZE specifies the size of the parameter and the following octet is the parameter data i.e. the value of SRPN. From this value a receiving decoder can determine whether a spare reference picture is defined, which may be used if the main reference picture has been lost or corrupted.

Alternatively, the information may be contained in the additional Supplemental Enhancement Information as specified in a "Draft of new Annex W: Additional Supplementary Enhancement Information Specification" P. Ning and S. Wenger, ITU-T Study Group 16 Question 15 Document Q15-I-58, November 1999.

In this draft proposal for Annex W, FTYPE 14 is defined as "Picture Message". When this FTYPE is set, the picture message function indicates the presence of one or more octets representing message data. The first octet of the message data is a message header with the structure shown in FIG. 9 i.e. CONT, EBIT and MTYPE. DSIZE is equal to the number of octets in the message data corresponding to a picture message function, including the first octet message header.

The continuation field CONT, if equal to 1, indicates that the message data associated with the picture message is part of the same logical message as the message data associated with the next picture message function. The End Bit Position field EBIT specifies the number of least significant bits that shall be ignored in the last message octet. Further details of these fields can be found in Annex W.

The field MTYPE indicates the type of message. Various types of message are suggested in the draft of Annex W. According to the invention one type e.g. MTYPE 13 is defined as Spare Reference Pictures. The value of MTYPE 13 is defined in the octet following the message header. The message data bytes contain the Picture Numbers of the spare reference pictures in preference order (the most preferred appearing first). Picture Numbers refer to the values that are transmitted according to Annex U or Annex W section W.6.3.12. The message format according to Annex W can be used for P, B, PB, Improved PB, and EP picture types. However, if Annex N or Annex U is in use and if the picture is associated with multiple reference pictures, the message format according to Annex W preferably shall not be used. For EP pictures, the message preferably shall be used only for forward prediction, whereas upward prediction may always be done from the temporally corresponding reference layer picture. For B, PB, and Improved PB picture types, the message specifies a picture for use as a forward motion prediction reference. This message shall not be used if the picture is an I or EI picture.

In a specific example where one spare reference picture is indicated and the SRPN is represented with 10 bits, this message contains one data byte, i.e., DSIZE is 3, CONT is 0, and EBIT is 6. It should be appreciated that the values of DSIZE, CONT and EBIT will vary according to the number of spare reference pictures indicated and the precision (number of bits) with which the spare reference picture numbers are represented. If more than one spare reference picture number is indicated, then preferably the message data bytes contain the Spare Reference Picture Number(s) of the spare reference pictures in preference order (the most preferred appearing first).

The above description has made reference to encoded video streams in which bi-directionally predicted pictures (B-pictures) are encoded. As mentioned earlier, B-pictures are never used as reference pictures. Since they can be discarded without impacting the picture quality of future pictures, they provide temporal scalability. Scalability allows for the decoding of a compressed video sequence at more than one quality level. In other words, a scalable multimedia clip can be compressed so that it can be streamed over channels with different data rates and still be decoded and played back in real-time.

Thus the video stream may be decoded in different ways by differing decoders. For instance, a decoder can decide only to decode the I- and P-pictures of a signal, if this is the maximum rate of decoding that the decoder can attain. However if a decoder has the capacity, it can also decode the B-pictures and hence increase the picture display rate. Thus the perceived picture quality of the displayed picture will be enhanced over a decoder that only decodes the I- and P-pictures.

Scalable multimedia is typically ordered so that there are hierarchical layers of data. A base layer contains a basic representation of the multimedia clip whereas enhancement layers contain refinement data on top of underlying layers. Consequently, the enhancement layers improve the quality of the clip.

Scalability is a desirable property for heterogeneous and error prone environments. This property is desirable in order to counter limitations such as constraints on bit rate, display resolution, network throughput, and decoder complexity.

Scalability can be used to improve error resilience in a transport system where layered coding is combined with transport prioritisation. The term transport prioritisation here refers to various mechanisms to provide different qualities of service in transport, including unequal error protection, to provide different channels having different error/loss rates. Depending on their nature, data are assigned differently. For example, the base layer may be delivered through a channel with a high degree of error protection, and the enhancement layers may be transmitted through more error-prone channels.

Generally, scalable multimedia coding suffers from a worse compression efficiency than non-scalable coding. In other words, a multimedia clip encoded as a scalable multimedia clip with enhancement layers requires greater bandwidth than if it had been coded as a non-scalable single-layer clip with equal quality. However, exceptions to this general rule exist, for example the temporally scalable B-frames in video compression.

The invention may be applied to other scalable video compression systems. For instance, in H.263 Annex O, two other forms of scalability are defined: signal-to-noise (SNR) scalability and spatial scalability.

Spatial scalability and SNR scalability are closely related, the only difference being the increased spatial resolution provided by spatial scalability. An example of SNR scalable pictures is shown in FIG. 10. SNR scalability implies the creation of multi-rate bit streams. It allows for the recovery of coding errors, or differences between an original picture and its reconstruction. This is achieved by using a finer quantizer to encode the difference picture in an enhancement layer. This additional information increases the SNR of the overall reproduced picture.

Spatial scalability allows for the creation of multi-resolution bit streams to meet varying display requirements and/or constraints. A spatially scalable structure is illustrated in FIG. 11. It is essentially the same as in SNR scalability except that a spatial enhancement layer attempts to recover the coding loss between an up-sampled version of the reconstructed reference layer picture and a higher resolution version of the original picture. For example, if the reference layer has a quarter common intermediate format (QCIF) resolution, and the enhancement layer has a common intermediate format (CIF) resolution, the reference layer picture must be scaled accordingly such that the enhancement layer picture can be predicted from it. The QCIF standard allows the resolution to be increased by a factor of two in the vertical direction only, horizontal direction only, or both the vertical and horizontal directions for a single enhancement layer. There can be multiple enhancement layers, each increasing the picture resolution over that of the previous layer. The interpolation filters used to up-sample the reference layer picture are explicitly defined in the H.263 standard. Aside from the up-sampling process from the reference to the enhancement layer, the processing and syntax of a spatially scaled picture are identical to those of an SNR scaled picture.

In either SNR or spatial scalability, the enhancement layer pictures are referred to as EI- or EP-pictures. If the enhancement layer picture is upwardly predicted from a picture in the reference layer, then the enhancement layer picture is referred to as an Enhancement-I (EI) picture. In this type of scalability, the reference layer means the layer "below" the current enhancement layer. In some cases, when reference layer pictures are poorly predicted, over-coding of static parts of the picture can occur in the enhancement layer, causing an unnecessarily excessive bit rate. To avoid this problem, forward prediction is permitted in the enhancement layer. A picture that can be predicted in the forward direction from a previous enhancement layer picture or, alternatively, upwardly predicted from the reference layer picture is referred to as an Enhancement-P (EP) picture. Note that computing the average of the upwardly and forwardly predicted pictures can provide bi-directional prediction for EP-pictures. For both EI- and EP-pictures, upward prediction from the reference layer picture implies that no motion vectors are required. In the case of forward prediction for EP-pictures, motion vectors are required.

The SRPN field can be associated with P, PB, Improved PB, and Enhancement Layer (EP) pictures. The characteristics of PB and Improved PB frames are described in H.263 Annex G and Annex M respectively.

However, if Annex N or Annex U is in use and if the picture is associated with multiple reference pictures, the SRPN is not used. For PB and Improved PB pictures, the message typically concerns only the P-part. For EP pictures, the message is used for forward prediction, whereas upward prediction is done from the temporally corresponding reference layer picture. This message preferably is not used if the picture is an I, EI or B picture.

If the encoder is capable of multi-layer coding (for example as discussed in Annex O of H.263) each layer has consecutive Spare Reference Picture Numbers. These may be associated with the enhancement layer number (ELNUM) of the current picture. The Spare Reference Picture Number is incremented by one from the corresponding number of the previous coded reference picture in the same enhancement layer. However, if adjacent pictures in the same enhancement layer have the same temporal reference, and if Annex N or Annex U of H.263 is in use, the decoder preferably regards this as an indication that redundant copies have been sent of approximately the same pictured scene content, and all of these pictures then share the same Picture Number.

It should also be noted that according to an embodiment of the invention, it is possible to indicate an SRPN for a specified rectangular area of the current picture. There may be multiple messages for one picture each specifying SRPNs for non-overlapping rectangular areas of the current picture. If the messages do not specify an SRPN for some areas of the picture, a decoder can use error concealment to conceal errors in those areas if the corresponding reference frame (or area thereof) from which they are predicted cannot be decoded. In this situation, the decoder preferably uses a concealment method that corresponds to the picture type i.e. for an INTRA picture an INTRA error concealment method is used and for an INTER picture an INTER error concealment method is used.

A specific example of the above situation, in which SRPN values are provided for different areas of a current picture, will now be given. Each SRPN message, comprises an SRPN and four PSUPP octets containing the horizontal and vertical location of the upper left corner of the specified rectangular area of the picture, and the width and height of the rectangular area, respectively, using eight bits each and expressed in units of 16 pixels (of luminance picture). For example, using this convention, an entire QCIF picture is specified by the four parameters (0, 0, 11, 9).

For picture formats having a width and height that is not divisible by 16, the specified area may extend to the next larger size that would be divisible by 16. For example, an entire image having size of 160×120 pixels is specified by the four parameters (0, 0, 10, 8). Preferably, the specified area does not cross picture boundaries nor overlap with other specified error concealment areas of the same picture.

The invention may be implemented in other video coding protocols. For example MPEG-4 defines so-called user data, which can contain any binary data and is not necessarily associated with a picture. The additional field may be added to these fields.

The invention is not intended to be limited to the video coding protocols discussed above: these are intended to be merely exemplary. The invention is applicable to any video coding protocol using temporal prediction. The addition of the information as discussed above allows a receiving decoder to determine the best cause of action if a picture is lost.

What is claimed is:

1. A method of operating an apparatus for encoding a video signal to form an encoded video signal, the video signal representing a sequence of pictures, the method comprising:
   obtaining a local default reference picture by encoding and decoding a picture of the sequence;
   forming a motion compensated prediction for a current picture of the sequence or a part of a current picture from the local default reference picture;
   generating an indicator for use in error concealment of the current picture or respectively for said part of a current picture, the indicator configured to identify an alternative reference picture, which is sufficiently similar to the local default reference picture so that it can be used in a corresponding decoding process, instead of a corresponding default reference picture, in forming a motion compensated prediction for the current picture or respectively for said part of a current picture when the corresponding default reference picture cannot be reconstructed in the corresponding decoding process; and
   providing the indicator for use in the corresponding decoding process to identify the alternative reference picture for use in error concealment.

2. A method according to claim 1, comprising:
   identifying the alternative reference picture for the current picture or said part of a current picture by comparing the local default reference picture with a further reference picture to calculate a measure of similarity between the two;
   comparing the measure of similarity against a pre-determined similarity criterion; and
   generating the indicator based on the comparison.

3. A method according to claim 1, comprising:
   forming a motion compensated prediction for at least part of the current picture from a first local default reference picture and a second local default reference picture, the first local default reference picture corresponding to a picture of the sequence occurring temporally before the current picture and the second local default reference picture corresponding to a picture of the sequence occurring temporally after the current picture;
   comparing the first local default reference picture with a further reference picture corresponding to a picture of the sequence occurring temporally before the current picture to calculate a measure of similarity between the two;
   comparing the measure of similarity against a pre-determined similarity criterion; and
   generating the indicator based on the comparison.

4. A method according to claim 2, comprising:
   identifying more than one alternative reference picture for the current picture or respectively for said part of a current picture by comparing the local default reference picture with a plurality of further reference pictures to calculate respective measures of similarity; and
   providing an indicator for each further reference picture that meets the predetermined similarity criterion to provide more than one indicator for the current picture or respectively for said part of a current picture.

5. A method according to claim 1, comprising providing the indicator in a picture header of the encoded video signal.

6. A method according to claim 1, comprising encoding the sequence of pictures according to the H.263 video compression standard and providing the indicator in the Supplemental Enhancement Information in accordance with the H.263 video compression standard.

7. A method of operating an apparatus for decoding an encoded video signal representing a sequence of pictures, the method comprising:
   determining that a default reference picture, for use in forming a motion compensated prediction for a current picture or a part of a current picture, cannot be reconstructed;
   examining an indicator provided for error concealment of the current picture or respectively for said part of a current picture to identify an alternative reference picture for use in forming a motion compensated prediction for the current picture or respectively for said part of a current picture; and
   using the alternative reference picture, instead of the default reference picture, to form a motion compensated prediction for the current picture or respectively for said part of a current picture in response to determining that the default reference picture cannot be reconstructed, thereby providing error concealment for the current picture or respectively for said part of a current picture.

8. An encoder for encoding a video signal to form an encoded video signal, the video signal representing a sequence of pictures, wherein the encoder is configured to:
   obtain a local default reference picture by encoding and decoding a picture of the sequence;
   form a motion compensated prediction for a current picture of the sequence or a part of a current picture using the local default reference picture;
   generate an indicator for use in error concealment of the current picture or respectively for said part of a current picture, the indicator configured to identify an alternative reference picture, which is sufficiently similar to the local default reference picture so that it can be used in a corresponding decoding process, instead of a corresponding default reference picture, in forming a motion compensated prediction for the current picture or respectively for said part of a current picture when the corresponding default reference picture cannot be reconstructed in the corresponding decoding process; and
   provide the indicator for use in the corresponding decoding process to identify the alternative reference picture for use in error concealment.

9. A decoder for decoding an encoded video signal representing a sequence of pictures, wherein the decoder is configured to:
   determine that a default reference picture, for use in forming a motion compensated prediction for a current picture or a part of a current picture, cannot be reconstructed;
   examine an indicator provided for error concealment of the current picture or respectively for said part of a current picture, to identify an alternative reference picture for use in forming a motion compensated prediction for the current picture or respectively for said part of a current picture; and use the alternative reference picture, instead of the default reference picture, to form a motion compensated prediction for the current picture or respectively for said part of a current picture in response to determining that the default reference picture cannot be reconstructed, thereby providing error concealment for the current picture or respectively for said part of a current picture.

10. A radio telecommunications device comprising an encoder for encoding a video signal to form an encoded video signal, the video signal representing a sequence of pictures, wherein the encoder is configured to:

obtain a local default reference picture by encoding and decoding a picture of the sequence;

form a motion compensated prediction for a current picture of the sequence or a part of a current picture from the local default reference picture;

generate an indicator for use in error concealment of the current picture or respectively for said part of a current picture, the indicator configured to identify an alternative reference picture, which is sufficiently similar to the local default reference picture so that it can be used in a corresponding decoding process, instead of a corresponding default reference picture, in forming a motion compensated prediction for the current picture or respectively for said part of a current picture when the corresponding default reference picture cannot be reconstructed in the corresponding decoding process; and provide the indicator for use in the corresponding decoding process to identify the alternative reference picture for use in error concealment.

11. A method according to claim 1, comprising providing the indicator in one of a picture segment header or a macroblock header of the encoded video signal when the indicator is associated with a part of a current picture.

12. A method according to claim 1, comprising generating the indicator to indicate one of a temporal reference of the alternative reference picture or a picture number of the alternative reference picture.

13. A method according to claim 1, comprising providing respective indicators to indicate corresponding alternative reference pictures for B pictures and P pictures.

14. A method according to claim 1, comprising providing indicators to indicate alternative reference pictures only for P pictures.

15. A method according to claim 2, comprising calculating the measure of similarity as a sum of absolute differences using differences in pixel values between the local default reference picture and the further reference picture.

16. A method according to claim 2, comprising calculating the measure of similarity between the local default reference picture and the further reference picture using picture histograms.

17. A method according to claim 1, comprising scalably encoding the video signal and providing respective indicators to indicate corresponding alternative reference pictures for predictively encoded enhancement layer pictures of the scalably encoded video signal.

18. A method according to claim 1, comprising providing the indicator with the current picture or respectively with said part of a current picture.

19. A method according to claim 7, comprising:

examining a ranking order of more than one indicator provided for the current picture or respectively for said part of a current picture;

selecting an indicator based on the ranking order; and using the alternative reference picture identified by the selected indicator to form a motion compensated prediction for the current picture or respectively for said part of a current picture.

20. A method according to claim 7, comprising obtaining the indicator from a picture header of the encoded video signal.

21. A method according to claim 7, comprising obtaining the indicator from one of a picture segment header or a macroblock header of the encoded video signal.

22. A method according to claim 7, comprising obtaining the indicator from Supplemental Enhancement Information of an encoded video signal encoded according to the H.263 video compression standard.

23. A method according to claim 7, comprising using the indicator to identify one of a temporal reference of the alternative reference picture or a picture number of the alternative reference picture.

24. A method according to claim 7, comprising using respective indicators to identify corresponding alternative reference pictures for B pictures and P pictures.

25. A method according to claim 7, comprising using respective indicators to identify corresponding alternative reference pictures for predictively encoded enhancement layer pictures of a scalably encoded video signal.

26. An encoder according to claim 8, wherein the encoder is configured to:

identify the alternative reference picture for the current picture or said part of a current picture by comparing the local default reference picture with a further reference picture to calculate a measure of similarity between the two;

compare the measure of similarity against a pre-determined similarity criterion; and generate the indicator based on the comparison.

27. An encoder according to claim 8, wherein the encoder is configured to:

form a motion compensated prediction for at least part of a current picture from a first local default reference picture and a second local default reference picture, the first local default reference picture corresponding to a picture of the sequence occurring temporally before the current picture and the second local default reference picture corresponding to a picture of the sequence occurring temporally after the current picture;

compare the first local default reference picture with a further reference picture corresponding to a picture of the sequence occurring temporally before the current picture to calculate a measure of similarity between the two;

comparing the measure of similarity against a predetermined similarity criterion; and generate the indicator based on the comparison.

28. An encoder according to claim 26, wherein the encoder is configured to:

identify more than one alternative reference picture for the current picture or respectively for said part of a current picture by comparing the local default reference picture with a plurality of further reference pictures to calculate respective measures of similarity; and provide an indicator for each further reference picture that meets a predetermined similarity criterion to provide more than one indicator for the current picture or respectively for said part of a current picture.

29. An encoder according to claim 8, wherein the encoder is configured to provide the indicator in a picture header of the encoded video signal.

30. An encoder according to claim 8, wherein the encoder is configured to provide the indicator in one of a picture segment header or a macroblock header of the encoded video signal when the indicator is associated with a part of a current picture.

31. An encoder according to claim 8, wherein the encoder is configured to encode the video signal according to the H.263 video compression standard and to provide the indicator in the Supplemental Enhancement Information in accordance with the H.263 video compression standard.

32. An encoder according to claim 8, wherein the encoder is configured to generate the indicator to indicate one of a temporal reference of the alternative reference picture or a picture number of the alternative reference picture.

33. An encoder according to claim 8, wherein the encoder is configured to provide respective indicators to indicate corresponding alternative reference pictures for B pictures and P pictures.

34. An encoder according to claim 8, wherein the encoder is configured to provide indicators to indicate alternative reference pictures only for P pictures.

35. An encoder according to claim 26, wherein the encoder is configured to calculate the measure of similarity as a sum of absolute differences using differences in pixel values between the local default reference picture and the further reference picture.

36. An encoder according to claim 26, wherein the encoder is configured to calculate the measure of similarity between the local default reference picture and the further reference picture using picture histograms.

37. An encoder according to claim 8, wherein the encoder is configured to encode the video signal as a scalable video sequence and to provide respective indicators to indicate corresponding alternative reference pictures for predictively encoded enhancement layer pictures of the scalable video sequence.

38. An encoder according to claim 8, wherein the encoder is configured to provide the indicator with the current picture or respectively with said part of a current picture.

39. A decoder according to claim 9, wherein the decoder is configured to:
examine a ranking order of more than one indicator provided for the current picture or respectively for said part of a current picture; and
select an indicator based on the ranking order; and
use the alternative reference picture identified by the selected indicator to form a motion compensated prediction for the current picture or respectively for said part of a current picture.

40. A decoder according to claim 9, wherein the decoder is configured to obtain the indicator from a picture header of the encoded video signal.

41. A decoder according to claim 9, wherein the decoder is configured to obtain the indicator from one of a picture segment header or a macroblock header of the encoded video signal.

42. A decoder according to claim 9, wherein the decoder is configured to obtain the indicator from Supplemental Enhancement Information of an encoded video signal encoded according to the H.263 video compression standard.

43. A decoder according to claim 9, wherein the decoder is configured to use the indicator to identify one of a temporal reference of the alternative reference picture or a picture number of the alternative reference picture.

44. A decoder according to claim 9, wherein the decoder is configured to use respective indicators to identify corresponding alternative reference pictures for predictively encoded enhancement layer pictures of a scalably encoded video signal.

45. A multimedia terminal device comprising an encoder for encoding a video signal to form an encoded video signal, the video signal representing a sequence of pictures, wherein the encoder is configured to:
obtain a local default reference picture by encoding and decoding a picture of the sequence;
form a motion compensated prediction for a current picture of the sequence or a part of a current picture from the local default reference picture;
generate an indicator for use in error concealment of the current picture or respectively for said part of a current picture, the indicator configured to identify an alternative reference picture, which is sufficiently similar to the local default reference picture so that it can be used in a corresponding decoding process, instead of a corresponding default reference picture, in forming a motion compensated prediction for the current picture or respectively for said part of a current picture when the corresponding default reference picture cannot be reconstructed in the corresponding decoding process; and
provide the indicator for use in the corresponding decoding process to identify the alternative reference picture for use in error concealment.

46. A method according to claim 1, comprising identifying the alternative reference picture for the current picture or said part of the current picture by comparing the current picture with a reference picture to calculate a measure of similarity between the two, comparing the measure of similarity against a pre-determined similarity criterion, and generating the indicator based on the comparison.

47. A method according to claim 4, comprising ranking the further reference pictures based on said comparison and providing said more than one indicator for the current picture or respectively for said part of a current picture in a ranking order, the indicator associated with the further reference picture having the closest similarity to the local default reference picture being placed first in the ranking order.

48. A radio telecommunications device comprising a decoder for decoding an encoded video signal representing a sequence of pictures, wherein the decoder is configured to:
determine that a default reference picture, for use in forming a motion compensated prediction for a current picture or a part of a current picture, cannot be reconstructed;
examine an indicator provided for error concealment of the current picture or respectively for said part of a current picture, to identify an alternative reference picture for use in forming a motion compensated prediction for the current picture or respectively for said part of a current picture; and
use the alternative reference picture, instead of the default reference picture, to form a motion compensated prediction for the current picture or respectively for said part of a current picture in response to determining that the default reference picture cannot be reconstructed, thereby providing error concealment for the current picture or respectively for said part of a current picture.

49. An encoder according to claim 28, wherein the encoder is configured to rank the further reference pictures based on said comparison and to provide said more than one indicator for the current picture or respectively for said part of a current picture in a ranking order, the indicator associated with the further reference picture having the closest similarity to the local default reference picture being placed first in the ranking order.

50. A multimedia terminal device comprising a decoder for decoding an encoded video signal representing a sequence of pictures, wherein the decoder is configured to:
   determine that a default reference picture, for use in forming a motion compensated prediction for a current picture or a part of a current picture, cannot be reconstructed;
   examine an indicator provided for error concealment of the current picture or respectively for said part of a current picture to identify an alternative reference picture for use in forming a motion compensated prediction for the current picture or respectively for said part of a current picture; and
   use the alternative reference picture, instead of the default reference picture, to form a motion compensated prediction for the current picture or respectively for said part of a current picture in response to determining that the default reference picture cannot be reconstructed, thereby providing error concealment for the current picture or respectively for said part of a current picture.

51. An apparatus for encoding a video signal to form an encoded video signal, the video signal representing a sequence of pictures, wherein the apparatus is configured to:
   obtain a local default reference picture by encoding and decoding a picture of the sequence;
   form a motion compensated prediction for a current picture of the sequence or a part of a current picture from the local default reference picture;
   generate an indicator for use in error concealment of the current picture or respectively for said part of a current picture, the indicator configured to identify an alternative reference picture, which is sufficiently similar to the local default reference picture so that it can be used in a corresponding decoding process, instead of a corresponding default reference picture, in forming a motion compensated prediction for the current picture or respectively for said part of a current picture when a the corresponding default reference picture cannot be reconstructed in the corresponding decoding process; and
   provide the indicator for use in the corresponding decoding process to identify the alternative reference picture for use in error concealment.

52. An apparatus for decoding an encoded video signal representing a sequence of pictures, wherein the apparatus is configured to:
   determine that a default reference picture, for use in forming a motion compensated prediction for a current picture or a part of a current picture, cannot be reconstructed;
   examine an indicator provided for error concealment of the current picture or respectively for said part of a current picture to identify an alternative reference picture for use in forming a motion compensated prediction for the current picture or respectively for said part of a current picture; and
   use the alternative reference picture, instead of the default reference picture, to form a motion compensated prediction for the current picture or respectively for said part of a current picture in response to determining that the default reference picture cannot be reconstructed, thereby providing error concealment for the current picture or respectively for said part of a current picture.

* * * * *